Patented Mar. 11, 1924.

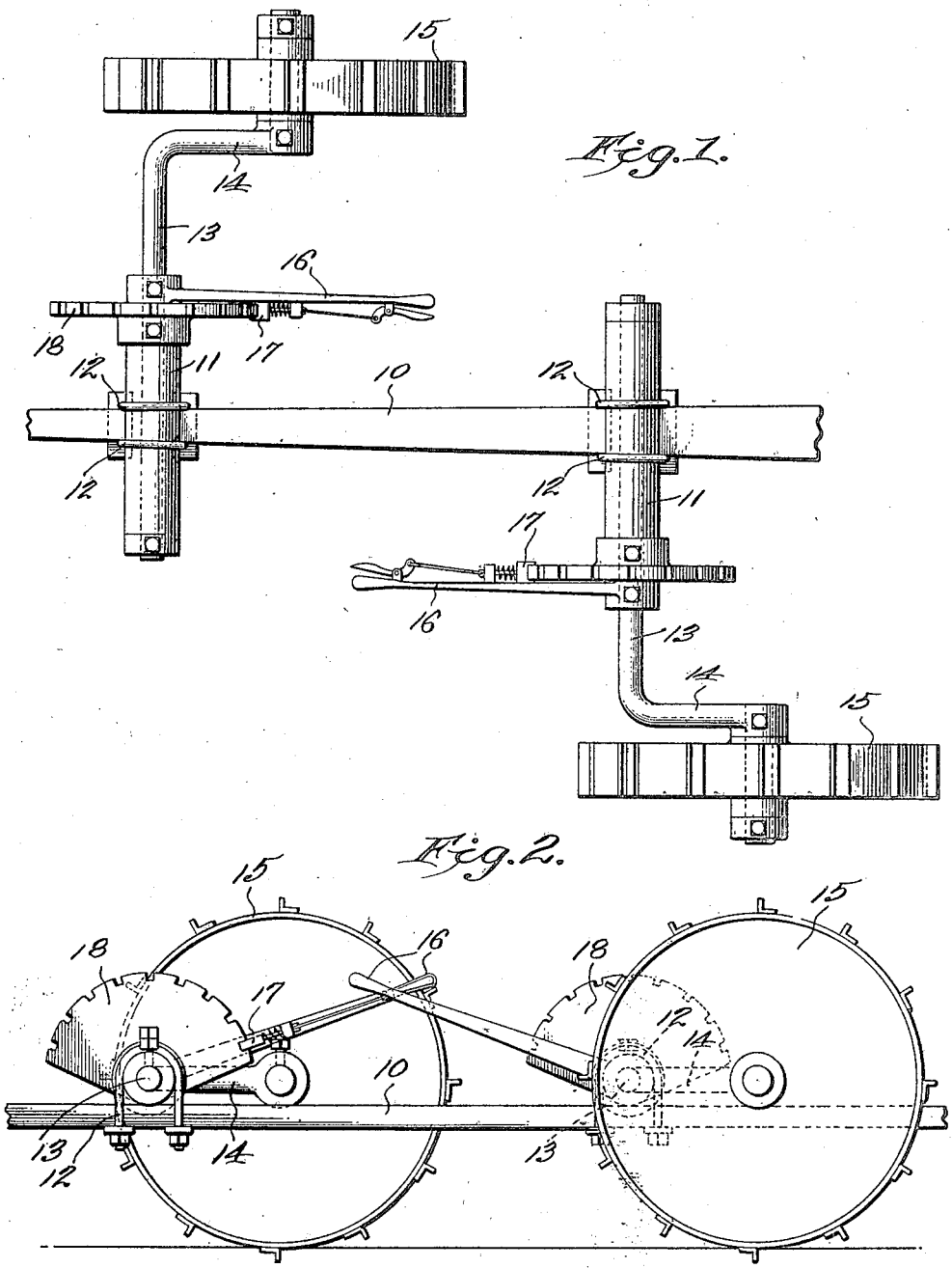

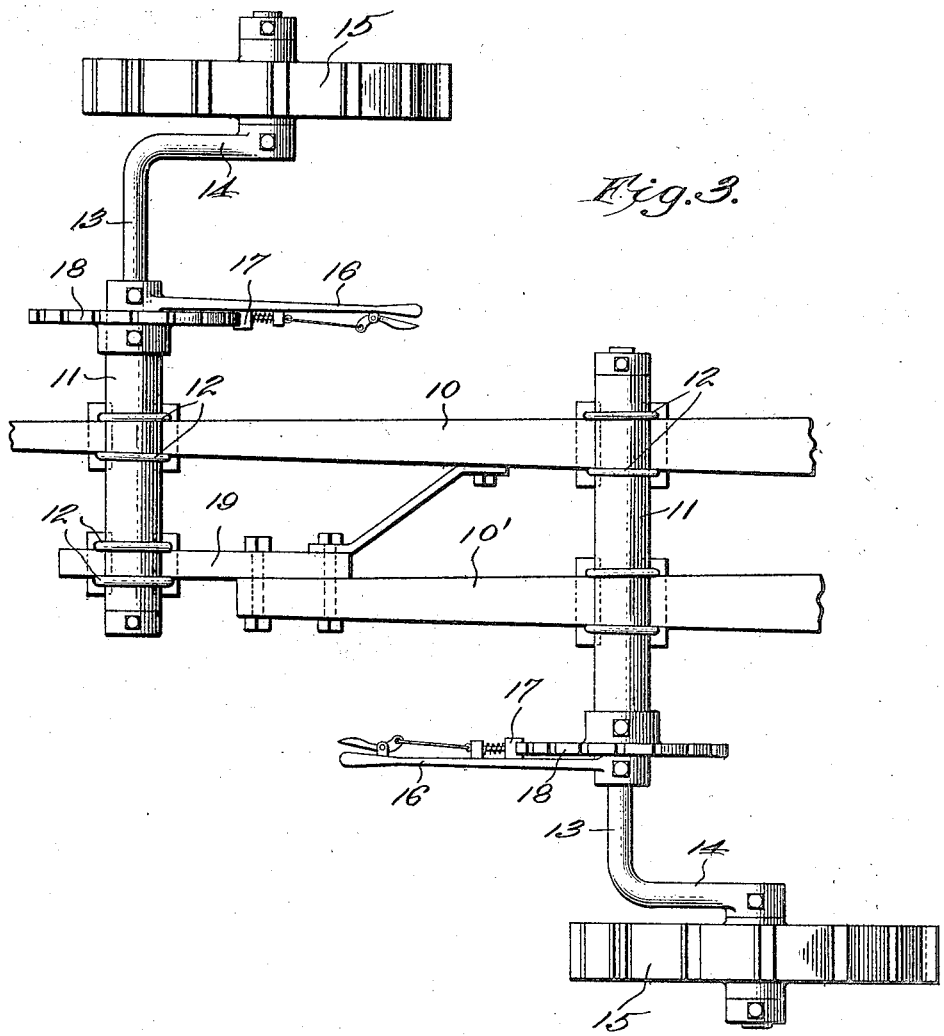

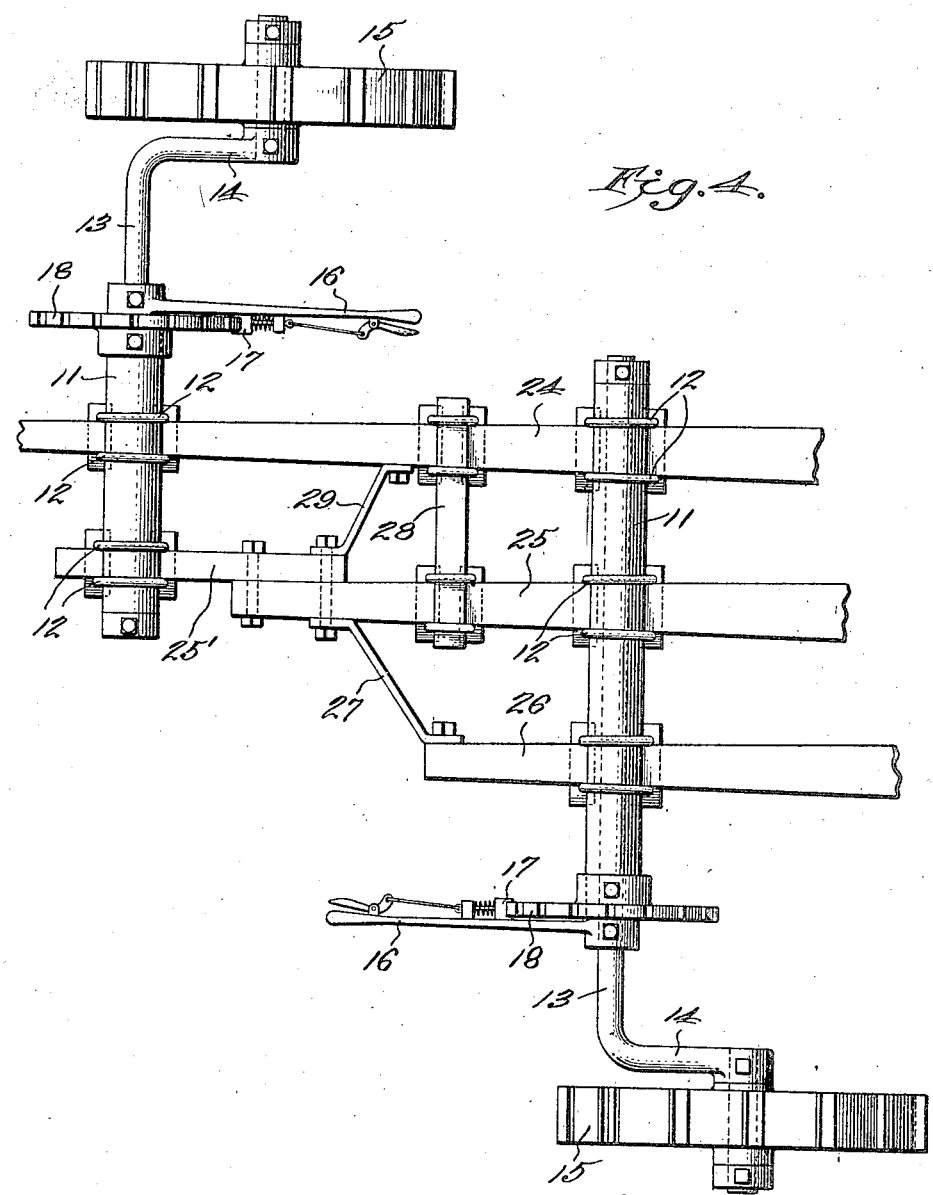

1,486,469

UNITED STATES PATENT OFFICE.

ELVY T. UNDERWOOD, OF FIELD CREEK, TEXAS.

PLOW CARRIER.

Application filed June 29, 1923. Serial No. 648,599.

*To all whom it may concern:*

Be it known that I, ELVY T. UNDERWOOD, a citizen of the United States, residing at Field Creek, in the county of Llano and State of Texas, have invented new and useful Improvements in Plow Carriers, of which the following is a specification.

This invention relates to wheeled plows, and has for its object the provision of a plow structure wherein one or a plurality of plow beams can be used in spaced parallel relation thereby varying the width of the plow and the number of the plows used.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a plan view of a plow wherein a single beam is used.

Figure 2 is a side elevation.

Figure 3 is a plan view of a plow using two beams.

Figure 4 is a view of a plow wherein three beams are used.

Referring to the drawings in detail and particularly to Figures 1 and 2, 10 indicates a single plow beam which is supported by spaced parallel carriers 11, to which the beam is clamped by saddle bolts 12. Each carrier 11 is provided with a bore to receive an axle 13, each axle having an offset portion 14 on which is journalled a wheel 15. It will be noted that the offset portions and wheels of the respective axle are arranged at opposite sides of the beam 10. The wheels are of course susceptible of being adjusted vertically with relation to the ground in the usual manner, for which purpose use is made of a lever 16 associated with each axle. Carried by this lever is a spring pressed pawl 17 which cooperates with a toothed segment 18 which holds the axle in adjusted positions.

In Figure 3, I have illustrated the plow as embodying two plow beams, namely the plow beam 10 used in Figure 1 and an additional plow beam 10'. The plow beam 10 is supported in the same manner upon the carriers 11, while the plow beam 10' is provided with an extension 19 which reposes upon the adjacent carrier 11 and secured thereto by means of saddle bolts 12. The other part of the beam 10' is similarly secured to the other carrier 11 as clearly illustrated. However this structure is the same as described in connection with Figure 1, the axle and wheels being adjusted with relation to the ground through the medium of levers 16.

In Figure 4, I have illustrated the plow making use of three beams indicated at 24, 25, 26. The plow beam 26 is supported by one of the carriers 11 and has its forward end attached to the correspondig end of the adjacent plow beam 25 by means of a brace bar 27. The plow beam 25 is clamped underneath to the same carrier 11 which supports the plow beam 24, but carried by this beam 25 is an extenison 25' which is secured to the other carrier 11 as shown. The plow beams 24 and 25 are further supported when associated by means of a cross piece 28 which connects these at appropriate points in their lengths. The beam 24 is also braced by the bracing bar 29, which has one end connected to the beam 24 and its other end connected to the beam extension 25'. The forward end of the beam 26 is secured underneath the carrier 11 and supports the beam extension 25'. It is manifest that the plow can be varied in width, and use is made of more than one plow to double or treble the amount of work accomplished at a given time, by simply making use of more plow beams which can be mounted upon the same carrier 11 and also associateed with each other in the manner illustrated.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. In a plow structure, spaced parallel beam carriers, axles supported by said carriers, a wheel journalled on one end of each axle, a plurality of plow beams arranged in spaced parallel relation and supported by said carriers, and a beam extension projecting forwardly from one end of one of said beams and supported on the adjacent carrier, and a brace rod connecting both of said beams to strengthen the structure.

2. In a plow structure, spaced parallel beam carriers, an axle supported by each carrier, a wheel journalled on one end of each axle, a pair of spaced parallel beams independently supported by one of said carriers, an intermediate beam including a beam extension, said beam and its extension being supported by both of said carriers, a cross piece connecting the intermediate beam with one of the pair of beams, brace rods connecting the first mentioned beams with the intermediate beam.

In testimony whereof I affix my signature.

ELVY T. UNDERWOOD.